United States Patent [19]
Konopka et al.

[11] 3,868,945
[45] Mar. 4, 1975

[54] SOLAR HEATER FOR SWIMMING POOLS

[75] Inventors: Edward J. Konopka, Royal Oak; Conan F. Fisher, Jr., Algonac, both of Mich.

[73] Assignee: Fun and Frolic Incorporated, Madison Heights, Mich.

[22] Filed: Mar. 10, 1972

[21] Appl. No.: 233,518

[52] U.S. Cl. ............... 126/271, 4/172.17, 165/177
[51] Int. Cl. ............................................ F24j 3/02
[58] Field of Search ....... 126/271; 165/177; 138/38, 138/48; 4/172, 172.15, 172.17

[56] References Cited
UNITED STATES PATENTS

| | | | |
|---|---|---|---|
| 2,197,243 | 4/1940 | Moran | 165/177 X |
| 2,626,130 | 1/1953 | Raskin | 62/523 X |
| 2,884,197 | 4/1959 | Whittel, Jr. | 4/172 |

Primary Examiner—Meyer Perlin
Assistant Examiner—Ronald C. Capossela
Attorney, Agent, or Firm—Fisher, Krass, Young & Gerhardt

[57] ABSTRACT

A heat exchanger for warming the water in a swimming pool during the day by means of solar heat and for cooling the water at night consisting of a pair of rectangular sheets of black matte finish flexible film plastic sealed together so as to form a closed perimeter having an inlet passage and an outlet passage, and a sinuous flow path consisting of a plurality of straight parallel elongated flow channels formed between the inlet and the outlet. At a plurality of points along each straight flow channel the two plastic sections are heat sealed together to form obstacles to the straight flow path creating zones of turbulance which enhance the efficiency of the heat exchange. A pump removes pool water from a drain, passes it through a filter and divides the filter output between one flow path back to the pool inlet and another flow path to the heat exchanger using an adjustable flow diverter consisting of a T-section having a movable tube extending up from the leg of the T into the arm.

10 Claims, 6 Drawing Figures

PATENTED MAR 4 1975

SOLAR HEATER FOR SWIMMING POOLS

FIELD OF THE INVENTION

This invention relates to heat transfer devices for heating swimming pool water through solar energy and for cooling that water through radiation to a cooler atmosphere and more particularly to such a device which is formed from a pair of sheets of heat sealed plastic film.

BACKGROUND OF THE INVENTION

It has previously been recognized that solar heaters provide a low cost and efficient solution to the problem of maintaining the water in swimming pools at a comfortable temperature. These heaters are simply inserted in the flow path which is necessary to filter the pool water. Then they can warm the water temperature as a result of absorption of solar radiation during the day and they may be used at night to cool the water by exchanging heat with the cooler atmosphere.

One particularly low cost and effective form of such pool water heat exchanger takes the form of a blanket formed of two layers of plastic film heat sealed to one another so as to form a closed tortuous flow path for pool water. Heat exchangers of this type are disclosed for example in U.S. Pat. Nos. 3,022,781 to Andrassy and 3,513,828 to Masters.

SUMMARY OF THE PRESENT INVENTION

The present invention contemplates a heat exchanger for use with swimming pools of the film plastic type incorporating several unique features which increase the efficiency and flexibility of the heat exchanger without appreciably increasing its cost.

Heat exchangers formed in accordance with the present invention employ a pair of rectangular sheets of black matte, opaque film plastic heat sealed together along a plurality of lines to form a single continuous sinuous flow path consisting of a plurality of straight line sections extending the length of the rectangle and joined to one another at their ends. At regular intervals along the heat sealed lines which form the side walls of the straight flow paths the sheets are heat sealed together to create projections extending transversely into the flow paths and forming obstacles which interrupt the laminar flow occurring along these paths. Downstream of these heat sealed obstacles the flow is highly turbulent. This has been found to substantially increase the heat transfer efficiency of the apparatus.

Another novel aspect of the present invention involves the provision of heat sealed grommets around the perimeter of the transfer apparatus. These are simply formed by providing double marginal seams about the perimeter of the sheets and sealing the sheets solidly between these borders at regular intervals to provide solid sections in which holes may be formed for support purposes. These grommets allow the heat exchanger to be supported on an adjustable inclined surface to present the optimum configuration for the reception of solar radiation.

Still another novel aspect of the present invention consists of a device employed to divert a portion of the flow from the pool's filter to the heat exchanger. In a typical installation with a large in-ground pool the heater will operate most efficiently if only a portion of the filter flow is passed through it. The portion of the flow that should be passed through the heater to obtain the optimum results is a variable depending upon such factors as the solar radiation intensity. The present invention provides a low cost, adjustable flow separator in the form of a T-section wherein the input is from one side of the arms of the T. A tubing section extends into the arm from the leg of the T and diverts a portion of the flow into the leg. The portion of the flow diverted is dependent upon the exact projection of the tube into the arm and the angle of attack of flow toward the diverter section.

Other objectives, advantages and applications of the present invention will be made apparent by the following detailed description of the preferred embodiment of the invention. The description makes reference to the accompanying drawings in which.

Figure 2:
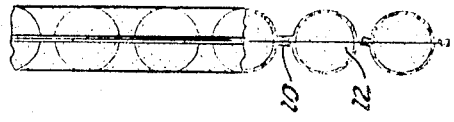
FIG. 2 is a cross sectional view of the heat exchanger taken along the line 2—2 of FIG. 1.

Referring to the drawings, a preferred embodiment of the heat transfer unit is formed from a pair of rectangular sheets of polyvinyl chloride film 10 and 12. Both sheets preferably are black in color. While their dimensions are not critical to the invention a typical heat exchanger will employ sheets of approximately four feet by seven feet. Polyvinyl chloride film of 0.010 inches or more in thickness is suitable for the practice of the invention.

The plastic sheets preferably have a matte or other form of non-reflective surface rather than a polished, reflective surface. We have found that use of a non-reflective surface substantially enhances the heat transfer properties of the unit.

The two sheets are laid adjacent to one another and are joined together along a plurality of lines by heat sealing or dielectric sealing. A pair of border lines 14 and 16, one inside the other, are formed adjacent to the edges of the sheet. These lines may be separated from one another by approximately one inch, and may extend around the full perimeter of the device. At regular intervals of approximately six inches the areas between border lines 14 and 16 are heat sealed together in an annular configuration 18 having a central hole 20. The hole 20 is later removed to form grommets which may be employed to support the heat exchanger on appropriate hangers.

The areas of the sheets 10 and 12 intermediate the border lines 14 and 16 are joined together along a plurality of lines 20 so as to form a single sinuous flow path extending from an inlet point 22 to an output point 21. The inlet and outlet points are passages through the border areas 14 and 16 in which cylindrical plastic hose connectors 26 and 28 are inserted.

The inlet connector 26 joins to a first passage 30 which extends along one short edge of the sheets. This channel extends to one of the long ends where it connects to a flow passage 32 that runs the full length of the sheet. The flow is then directed to the next longitudinal path 34 and continues in this manner for the total width of the heat exchanger until it is returned to the outlet passage 21 via a flow section 36.

Figure 4:
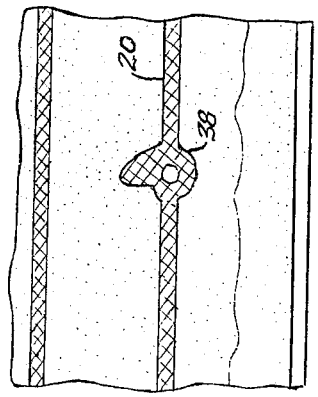
FIG. 4 is a detailed sectional view of one of the protuberances in the heat sealed channel walls which create turbulence in the flow channels.

The flow channels are defined with heat sealed lines approximately ⅛ inch in thickness. In order to prevent the flow from becoming highly laminar, which would decrease the heat transfer efficiency of the device, the sealing area is widened in accordance with a predetermined pattern at regular intervals along each flow path as at 38. These protuberances extend into a pair of flow paths on the adjacent sides of the heated sealed edge. A typical flow protuberance is illustrated in FIG. 4, and simply consists of a smooth-edged projection which diminishes and diverts the flow area so as to create turbulence in the area of the projection.

When a fluid flow is introduced to the heat exchanger through the inlet connector 26, in a manner which will be subsequently described, the flow causes the nonsealed sections of the sheets 10 and 12 to separate to form a plurality of closed flow channels as is best seen in FIG. 2. The fluid first passes through the flow channel 30 into the flow channel 32 and from there into the flow channel 34 and continues to flow the length of the heat exchanger in a zig-zag manner until it reaches the flow channel 36 and then passes out of the heat exchanger through the outlet connector 28. The protuberances 38 tend to break up the laminar flow, as do the broad transitions in flow path which occur at the end of the channel, to provide a turbulent condition which enhances the heat transfer characteristics of the unit.

Figure 1:
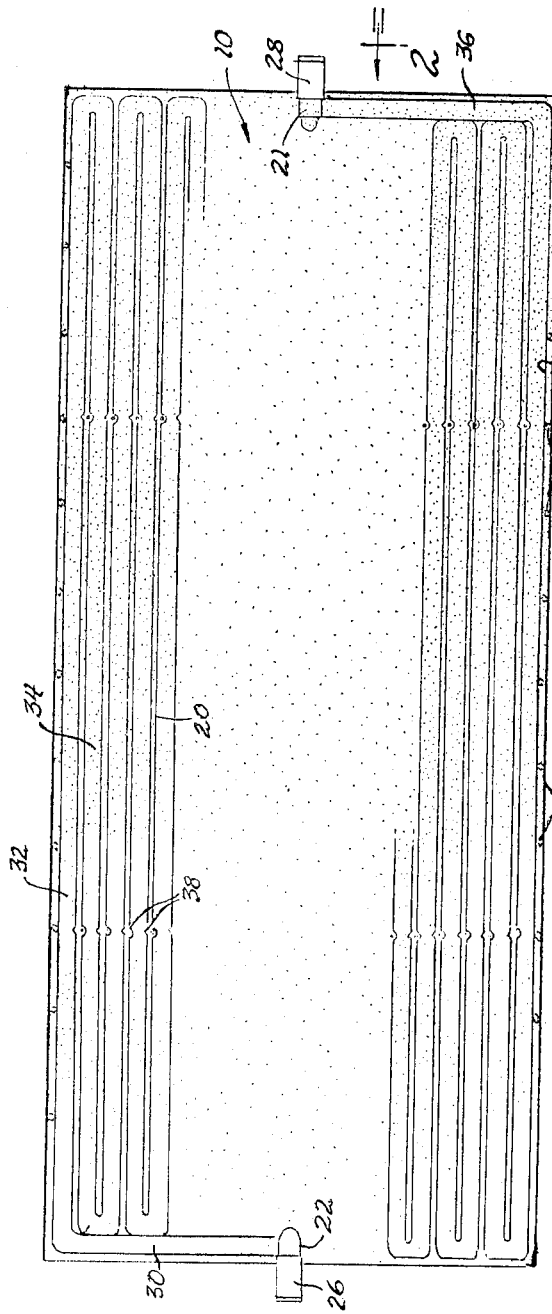
FIG. 1 is a plan view of a heat exchanger forming a preferred embodiment of the invention, with portions broken away to show specific details of construction.
Figure 3:
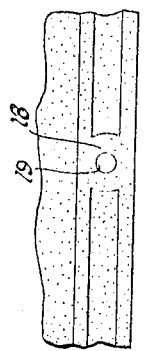
FIG. 3 is a detailed sectional view of one of the edge grommets formed in the heat exchanger.
Figure 5:
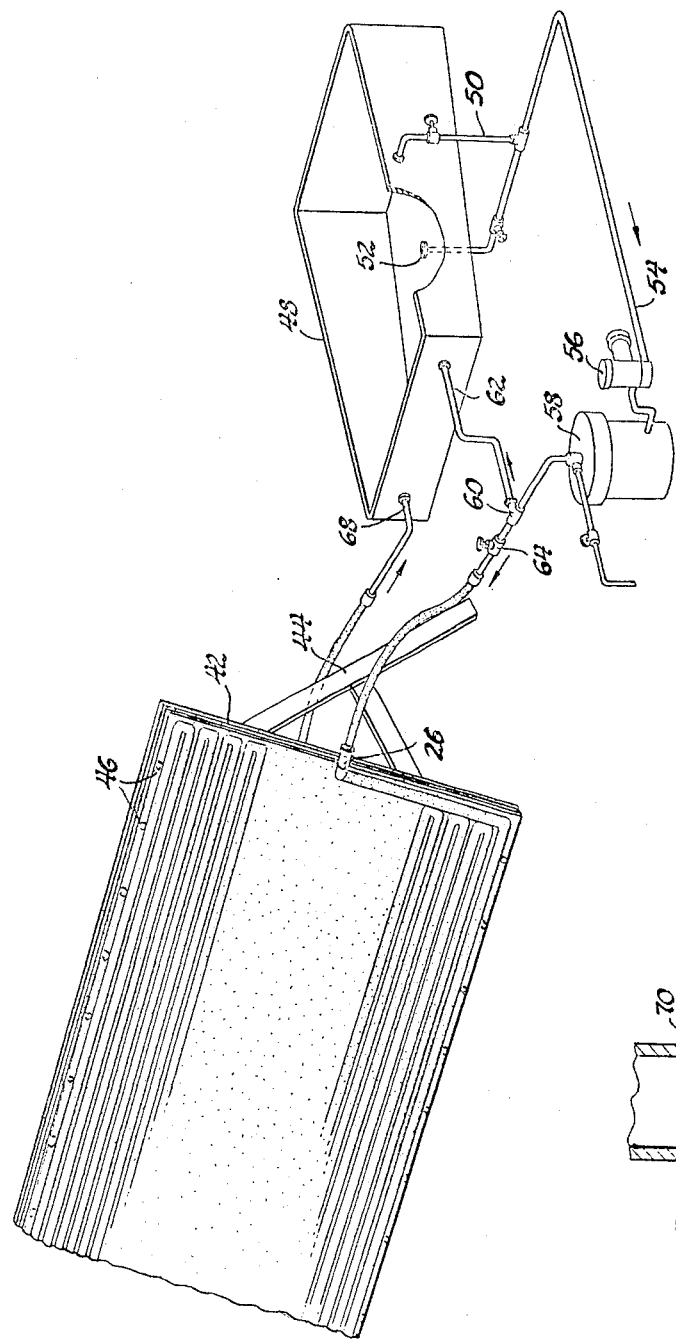
FIG. 5 is a perspective view of a heat transfer system incorporating the present invention.

FIG. 5 illustrates the manner in which the heat exchanger of FIG. 1 may be supported and connected to a pool. As illustrated therein, an inclined board 42 having an area slightly in excess of the heat exchanger is supported above the ground with appropriate brackets 44. The angle of inclination of the surface of the board is chosen to be such as to extend normally to the sun's rays. The exact angle differs with various locations, seasons and times of day. The support 44 is preferably adjustable so that the angle of inclination of the board 42 may be modified.

The heat exchanger is supported on the board by slipping the grommets 18 along one edge of the heat exchanger over hooks or screws 46 arrayed along the top edge of the board so that the heat exchanger lies along the board. FIG. 5 also illustrates the manner in which the heat exchanger may be connected to a swimming pool 48 of the in-the-ground variety. The swimming pool is equipped with a first drain 50 located in a sidewall and a second drain 52 located in its bottom. Both of these drains are connected to a line 54 which conveys the fluid to the intake of a suitable pump 56, preferably of the centrifugal variety. The pump forces water through a normal swimming pool filter 58 of the diatomaceous earth or other standard variety. The outlet of the filter 58 is divided into two sections by an adjustable flow diverter valve 60 which will be subsequently disclosed in detail. One portion of the flow is directed back to the pool through an inlet 62 and the balance is provided to the inlet 26 of the heat exchanger through a line which may include a shut-off valve 64. The outlet of the heat exchanger is provided to another pool inlet 68 from the output connector 28.

Figure 6:
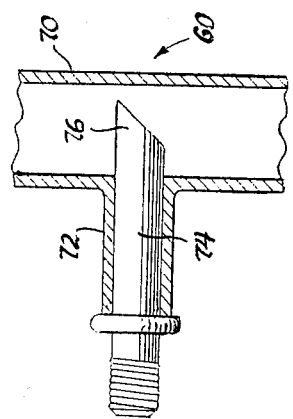
FIG. 6 is a detailed sectional view through a flow separator used in connection with the present invention.

As is illustrated in FIG. 6, the flow diverter valve comprises a plastic T-section incorporating an arm 70 having a leg section 72 joining at right angles. A tubular insert 74 disposed within the leg sections has an open truncated end 76 which projects into the center of the arm 70. The far extending edge of the end 76 terminates just short of the far wall of the arm 70. The angle of inclination of the insert 74 and its depth of extension within the leg 72 may be adjusted so as to capture a controlled amount of the flow through the arm 70 into the leg 72. Assuming the flow through the arm 70 is in an upward direction as viewed in FIG. 6, if the truncated section 76 is adjusted so as to face downwardly, in the manner shown, an appreciable percentage of flow through the arm will be diverted into the leg. However, if the insert 74 is rotated so that the truncated section does not face the flow, a smaller percentage of the flow through the arm will be diverted into the leg. When the insert has been rotated through 180° so that the truncated section 76 faces upwardly, no appreciable flow from the arm will be diverted into the leg.

The flow diverter valve 60 is employed in the arrangement of FIG. 5 to control the portion of the flow from the filter 58 that is passed through the heat transfer unit in order to control the temperature of the pool and optimize the heat transfer. For example, during daylight hours, when the water in the pool is sufficiently warm, the insert 74 is rotated so that no appreciable flow occurs through the heat exchanger, but rather the flow from the filter is passed directly back to the pool through the inlet 62. On a sunlit day, when the water in the pool is too cool, most of the flow may be diverted through the heat exchanger; however, the flow may be diminished under these circumstances to achieve an optimum heating since an excess of flow through the heat exchanger will result in a decrease in its efficiency.

The heat exchanger may also be used at night to cool the water of a pool that has been overheated by the sunlight during the day. The accumulation of dew on the surface of the heat exchanger and its resultant condensation, aids in the cooling phenomena.

With simpler pools, such as splash pools, there may be no need for a flow diverter valve and the entire flow may be passed through the heat exchanger. When not in use the heat exchanger can be readily folded into a compact configuration for storage. The exchanger itself is low in cost because of the simple materials used and may be readily added to a pool already having a pump and filter at very slight cost.

It has been found that the use of black matte plastic for both layers of the heat exchanger results in maximum energy retention. This is contradictory to previous teachings which suggest the use of a clear plastic top layer for such heat exchangers and a black plastic bottom layer.

The embodiments of the invention in which an exclusive property or privilege is claimed are defined as follows:

1. A heat exchanger for water consisting of a pair of sheets of plastic film of substantially identical configuration abutting one another with their edges sealed together and lines intermediate the edges sealed together so as to form a single continuous sinuous flow path formed of a plurality of straight line sections between a pair of end connectors which pass through the edges; and a plurality of sections wherein the pair of sheets are sealed together formed along such straight line sections and portions extending into the straight sections so as to interrupt laminar flow to create turbulence in the flow along the straight line sections and thereby enhance the heat transfer efficiency of the exchanger.

2. The heat exchanger of claim 1 wherein the sheets of plastic film are both opaque.

3. The heat exchanger of claim 1 wherein the sheets of plastic film are both black.

4. The heat exchanger of claim 3 wherein the sheets of black plastic film have a matte finish.

5. A heat exchanger for water consisting of a pair of sheets of plastic film of substantially identical configuration abutting one another with their edges and lines intermediate their edges sealed together so as to form a single continuous sinuous flow path formed of a plurality of straight line sections between a pair of end connectors which pass through the edges; and a plurality of sections wherein areas on the opposed sheets are sealed together formed at spaced intervals along said straight line sections so as to provide portions which partially block the flow channels along said straight line sections to create turbulence in the fluid flowing along the straight line sections and enhance the thermal efficiency of the exchanger.

6. A swimming pool system including a pool having an inlet and an outlet; pump means for removing water from the outlet; a manually adjustable flow diverter device connected to the output of the pump having one connection to the pool input; a solar heat exchanger having its input connected to another output of the adjustable flow diverter; and a connection between the output of said heat exchanger and the inlet of said swimming pool, whereby the portion of the water pumped out of the outlet of the swimming pool which is passed through the heat exchanger may be adjusted to optimize the temperature increase in the pool water; and wherein the heat exchanger consists of a pair of sheets of plastic film of substantially identical configuration abutting one another with their edges heat sealed together and lines intermediate the edges sealed together so as to form a single continuous sinuous flow path formed in a plurality of straight line sections between a pair of end connectors which pass through the edges, and a plurality of sections wherein the sheets are sealed together formed along such straight line sections and having portions interrupting the laminar flow to create turbulence in the flow along the straight line sections.

7. The swimming pool system of claim 6 wherein a filter is disposed in the fluid connection between the pump and the adjustable diverter device.

8. The swimming pool system of claim 6 wherein the adjustable diverter device consists of a T-section of tubing having a leg intersecting an arm, and a tubular insert section supported within said leg so as to project into the arm with its angle of rotation and its depth of penetration within the arm both being adjustable.

9. The swimming pool system of claim 8 wherein said tubular insert has a truncated end which extends into the arm of the T and the proportion of fluid flowing through the arm of the T which is diverted to the leg is proportional to the angle of the tubular section relative to the arm of the T.

10. The swimming pool system of claim 8 wherein said tubular insert has a truncated end which extends into the arm of the T and the proportion of fluid flowing through the arm of the T which is diverted to the leg is proportional to the depth of insertion of the insert within the arm.

* * * * *